Figure 1:
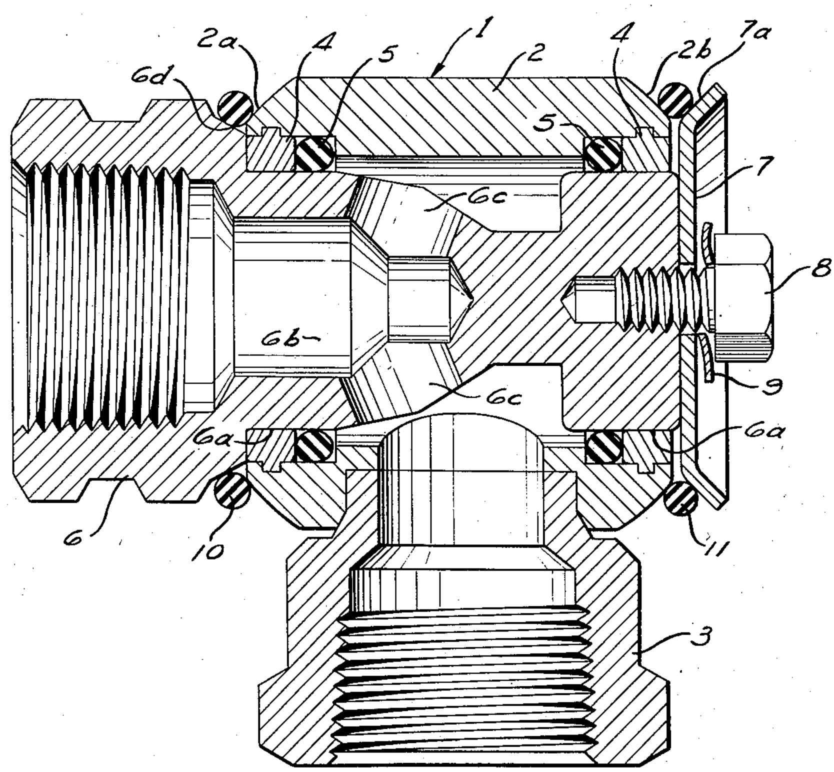

Feb. 3, 1959

E. M. MAY 2,872,217

DIRT SHIELD FOR SWIVEL JOINTS

Filed Oct. 3, 1956

INVENTOR.
Edward M. May
BY
Ray S. Gehr
ATTORNEY

United States Patent Office 2,872,217 Patented Feb. 3, 1959

2,872,217

DIRT SHIELD FOR SWIVEL JOINTS

Edward M. May, Detroit, Mich.

Application October 3, 1956, Serial No. 613,773

4 Claims. (Cl. 285—45)

This invention relates to swivel joints.

Such joints often must operate in grit, as in the case of joints on grinding machines, or in watery mud, as in the case of joints on earth-moving equipment. The entry of such foreign material into the joint results in undue wear and deterioration of the joint bearing surfaces and, in the case of swivel conduit joints, may result in destruction of the joint packings and also in contamination of the working fluid passing through the jointed conduit, which in turn may seriously damage costly apparatus served by the fluid. Accordingly various forms of boots or covers have been proposed for swivel joints. These have not provided a satisfactory solution of the problem because they do not provide water-tight joints and so allow more or less grit to enter.

It is a primary object of the present invention to provide a swivel joint which is practically perfectly shielded against entry of grit or other foreign substances, either solid or liquid, between the mutually engaging, relatively moving bearing surfaces of the joint.

Further objects of the invention are comprised in the provision of a dirt-shielded joint which is characterized by very simple construction and ease and low cost of manufacture and assembly.

With the foregoing objects in view the invention consists in forms, arrangements and combinations of parts exemplified in the accompanying drawing of a preferred embodiment of the invention which will now be described, the invention being defined in claims appended to the description.

In the drawing the single figure is an axial sectional view of a swivel joint embodying the present invention, the joint shown being of the conduit type.

In the disclosed construction, a female fitting generally designated by numeral 1 comprises a tubular bearing part 2 and a conduit part 3 hermetically joined, as by welding or brazing, to the part 2. The bore of bearing part 2 is enlarged at its ends to receive bearing rings 4, 4 which are pressed into interlocking engagement with the bore, the enlarged end parts of the bore also providing annular recesses adjacent the bearing rings to receive O-rings 5, 5 of rubber or the like. For convenience, the axial length of the part 2, with its attached rings 4, 4, is termed the bearing zone of the joint.

Mounted in the bore of female bearing part 2 is a conduit type male member 6 having peripheral bearing surfaces *6a*, *6a* to rotatably engage the bearing rings 4, 4, the bearing engagement of the male and female parts being rendered fluid tight in known manner by the packing rings 5, 5. Male member 6 has an axial bore *6b* which connects at its inner end with branch passages *6c*, *6c*, so that fluid entering bore *6b* can pass into the chamber of bearing part 2 and issue through the bore of conduit part 3, or fluid entering through part 3 can issue through the bore of the male part 6. The bores of parts 3 and 6 are formed with taper pipe threads for the attachment of conduit fittings as may be desired. To retain the male part 6 in working relation in the bore of part 2 with freedom for limited axial movement of the two parts to insure their free swiveling action, the male part is fitted at its front end with a disc 7 secured by machine screw 8 and lock washer 9. The flat surface of disc 7 engages the flat end of part 6 with a fluid tight joint.

As already noted, swivel joints required to operate in the presence of grit or wet mud have proven troublesome and the previously used expedient of boots or covers enclosing the joint fittings has been unsatisfactory because it is practically impossible to render such covers sufficiently fluid tight to be effective. In the case of the present invention the desired result is secured by providing an outwardly flaring annular space between the male and female structures at each end of the bearing zone of the joint, and mounting in each such space a tensioned ring of rubber or other suitable elastic material. Thus in the construction illustrated the male member 6 has its outer surface flared at *6d* and preferably the adjacent annular surface of the part 2 is oppositely flared or beveled at *2a*. In the annular flaring space thus formed between the said flared surfaces is disposed an elastic ring 10 which is of a diametral size when untensioned smaller than the minimum diameter of the flaring space so that when the ring 10 is stretched over the joint parts it contracts into effective fluid-tight engagement with the flaring surfaces *6d* and *2a*, and by is tensional elasticity maintains such contact notwithstanding limited axial movement of the male and female joint parts in the normal operation of the joint. When such axial movement occurs one of the rings 10 and 11 expands in diameter and the other contracts.

Similarly, at the other end of the bearing zone of the swivel joint part 2 has a flaring or beveled surface *2b* and the peripheral part of the disc 7 is shaped to form an oppositely flared surface *7a*. And in the outwardly flaring space between surfaces *2b* and *7a* is arranged a tensioned elastic ring 11 similar to the previously described ring 10. As in the case of ring 10, the ring 11, when untensioned, is of a diameter to contract into fluid-tight engagement with the surfaces *2b* and *7a*.

It will be apparent that a pair of smooth surfaced rubber O-rings are admirably adapted to serve effectively as rings 10 and 11, that the flaring surfaces of the male and female parts of the swivel joint which cooperate with the rings 10 and 11 add very little to the cost of the joint, the only requirement as to the said surfaces being a degree of smoothness to insure continuous liquid tight engagement between the rings and the surfaces entirely around the joint. The rings 10 and 11 are easily applied and removed and do not add to the bulk of the joint. At the same time the elastic rings effectively shield the joint against entrance to the bearing surfaces of grit or other foreign material, and since the seal between the rubber rings and the joint parts is fluid tight any accumulation of foreign material on the rings can easily be removed by flushing with water or compressed air when it may become necessary to disassemble the joint.

In the case of conduit type fluid joints, disclosed herein for purposes of explanation of the invention, if outward leakage of fluid past the sealing rings 5, 5 occurs, the shield rings 10, 11 by slightly stretching momentarily act to release the leakage fluid outward and so maintain their effective engagement with the flaring surfaces of the joint. In case a condition of partial vacuum exists within the conduit system, it is clear that the external air pressure on rings 10 and 11 is added to the effect of the elastic tension of the rings and thus enables them to supplement the action of the internal sealing rings 5, 5.

In the embodiment of the invention, it will be understood that the structural details may vary widely within the meaning of the appended claims which define the scope of the invention. For example, while in the preferred construction shown, the joint surfaces bounding both sides of the flaring spaces in which the shielding rings 10 and 11 are disposed, are flared outward, it may suffice to have one bounding surface only flared. In either case, of course, a flaring space for the ring 10 or 11 is secured and the conditions necessary to the effectiveness of the dirt shield are met, provided that the annular surfaces of both the male and the female structures which define the flaring spaces for the shielding rings extend transversely with respect to the axis of relative rotation of the male and female parts. Because of this relationship the tension of the elastic rings maintains them effectively in contact with both of the annular surfaces. And, by way of further example, while the circular cross-sectional shape of the shielding rings 10 and 11 is especially well adapted for cooperation in the manner described with the annular joint surfaces which define the flaring spaces in which the rings are disposed, the advantages of the invention can be had in substantial measure by use of rings of other cross-sectional shapes.

What is claimed is:

1. In a swivel joint the combination of male and female structures formed and arranged for rotation and limited axial movement in relation to each other, the two structures having mutually cooperating coaxial bearing surfaces formed on the two parts, respectively, and having at each end of the bearing zone of the joint a pair of mutually adjacent exterior annular surfaces both of which extend transversely with respect to the bearing axis of the joint and together define an outwardly flaring annular space between the male and female structures, and a circumferentially tensioned ring of elastic material movably disposed in the flaring space, the ring having an inner diametral size when untensioned smaller than the minimum diameter of the flaring space and having two annular surface portions of convexly curved cross-sectional form which are held by the inherent tension of the ring in close engagement throughout their lengths with the opposing annular surfaces of the male and female structures of the joint.

2. A swivel joint as claimed in claim 1 in which the male and female parts are interiorly chambered and have their coaxial bearing surfaces fitted with annular packing means to afford a fluid tight conduit through the joint.

3. A swivel joint as claimed in claim 1 in which the male structure comprises a disc tightly held against one end of the said structure and having its peripheral part flared outward and engaged by one of the tensioned rings.

4. A swivel joint as claimed in claim 1 in which the ring of elastic material is a rubber O-ring.

References Cited in the file of this patent

UNITED STATES PATENTS

| | | |
|---|---|---|
| 807,739 | Hanson | Dec. 19, 1905 |
| 952,608 | Coppersmith | Mar. 22, 1910 |
| 2,294,160 | Crane | Aug. 25, 1942 |
| 2,473,502 | Bard | June 21, 1949 |
| 2,481,404 | Donner | Sept. 6, 1949 |
| 2,655,391 | Atkins | Oct. 13, 1953 |
| 2,676,038 | McConnell | Apr. 20, 1954 |
| 2,746,773 | Bily | May 22, 1956 |